United States Patent [19]

Mason

[11] 3,958,818

[45] May 25, 1976

[54] FITTING ASSEMBLY FOR FLEXIBLE TUBING

[75] Inventor: Richard Lewis Mason, Hoffman Estates, Ill.

[73] Assignee: Litton Industrial Products, Inc., Beverly Hills, Calif.

[22] Filed: Oct. 21, 1974

[21] Appl. No.: 517,580

Related U.S. Application Data

[63] Continuation of Ser. No. 284,213, Aug. 28, 1972, abandoned.

[52] U.S. Cl. .................... 285/92; 174/75 C; 174/65 R; 285/250; 285/331; 285/384
[51] Int. Cl.[2] .................................. F16L 15/00
[58] Field of Search ............ 285/250, 92, 356, 343, 285/331, 384, 353, 354, 386, 357, 243, DIG. 4, 322; 174/65 R, 75 C

[56] References Cited
UNITED STATES PATENTS

| | | | |
|---|---|---|---|
| 956,077 | 4/1910 | Greenfield | 285/250 |
| 1,315,784 | 9/1919 | Levitt | 285/243 X |
| 1,814,474 | 7/1931 | Metcalf | 285/356 X |
| 1,840,312 | 1/1932 | Dunmire | 285/353 X |
| 1,927,390 | 9/1933 | Church | 285/340 |
| 2,323,912 | 7/1943 | Johnson | 285/354 X |
| 2,354,538 | 7/1944 | Porker | 285/354 X |
| 2,503,169 | 4/1950 | Phillips | 285/250 |
| 3,291,895 | 12/1966 | Van Dyke | 174/65 R X |
| 3,653,691 | 4/1972 | Brom | 285/353 |
| 3,687,495 | 8/1972 | Sukomuto et al. | 285/356 |
| R21,603 | 10/1940 | Guarnaschelli | 285/353 X |

Primary Examiner—Dave W. Arola
Attorney, Agent, or Firm—Robert M. Vargo

[57] ABSTRACT

A fitting assembly is disclosed for connection to the ends of flexible tubing. The fitting assembly comprises a first and second element and a sleeve. The first element includes a threaded bore and a plurality of flanged tines extending axially therefrom. The flexible tubing is adapted to be threaded through the bore of the first element until a portion of its end extends alongside and beyond the tines. The second element includes a bore having interior annular ridges formed on the interior surface thereof for receiving the flanged tines of the first element. The second element also includes an annular shoulder located on the sidewall of the bore. The sleeve is cylindrical in construction and includes an enlarged end. The sleeve is adapted to fit snugly within the end of the flexible tubing prior to the interconnection of the first and second elements. After the first element is threaded onto the tubing and the sleeve is inserted therein, the first and second elements are brought together for connection. During this movement, the enlarged end of the sleeve abuts the shoulder of the second element and thereafter acts on the flexible tubing to axially compress the free end of the tubing located between the tines against the threaded connection of the first element. This causes the threads of the free end of the tubing to expand radially and frictionally engage the interior surfaces of the two elements. This frictional engagement prevents the flexible tubing from unthreading from its connection with the fitting. The sleeve also functions to prevent the threads of the free end of the tubing from radially contracting and being pulled out of threaded connection with the first element.

5 Claims, 4 Drawing Figures

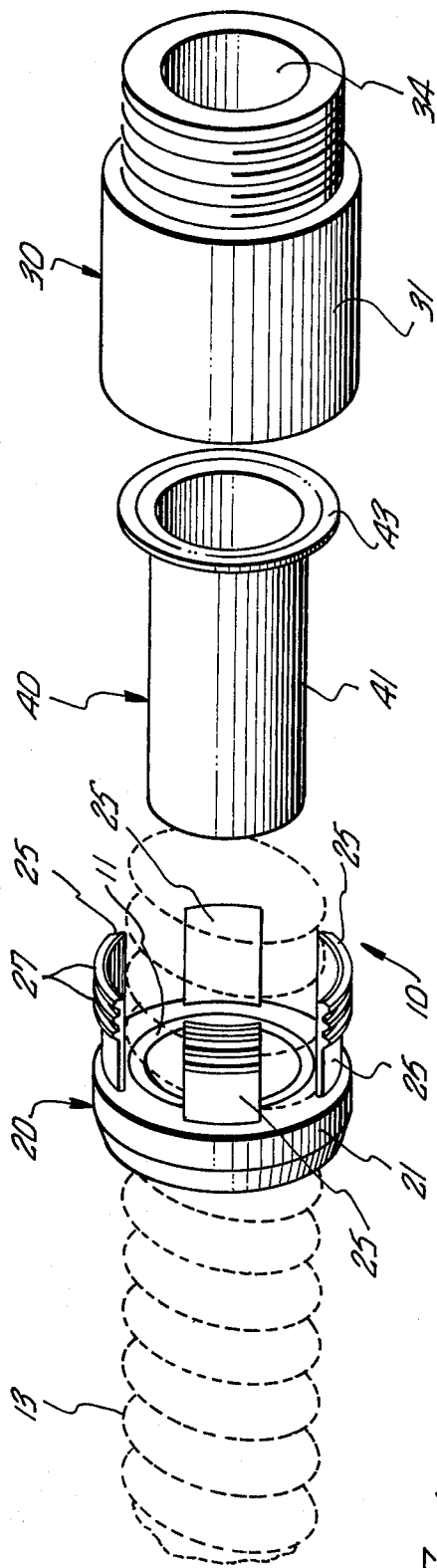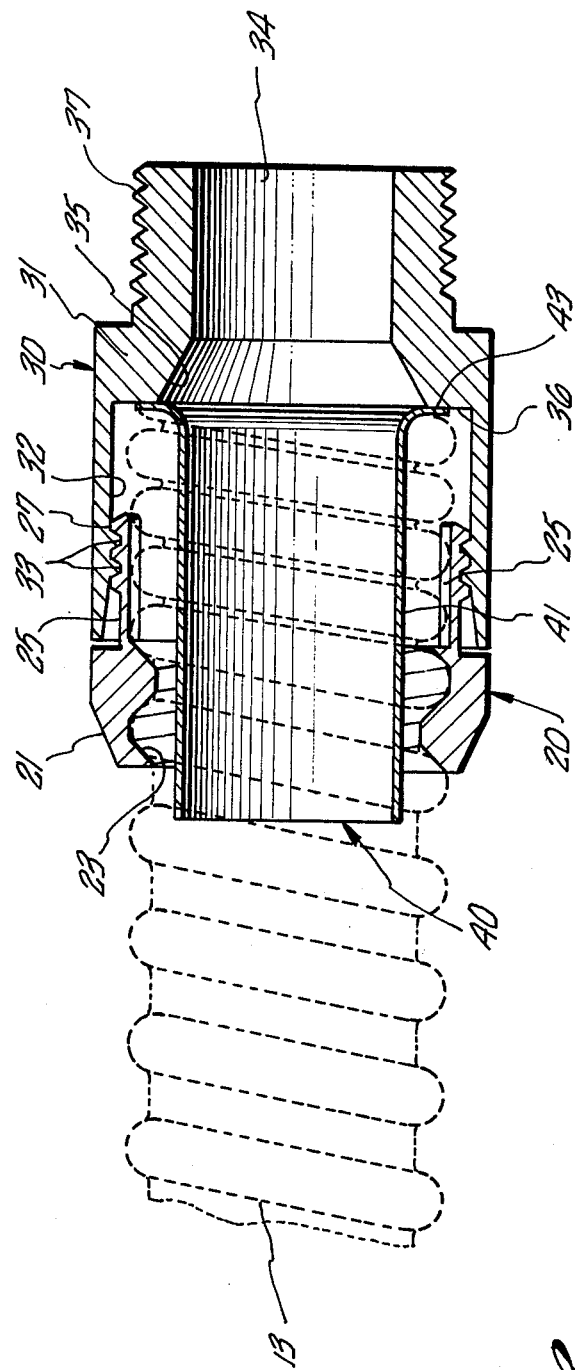

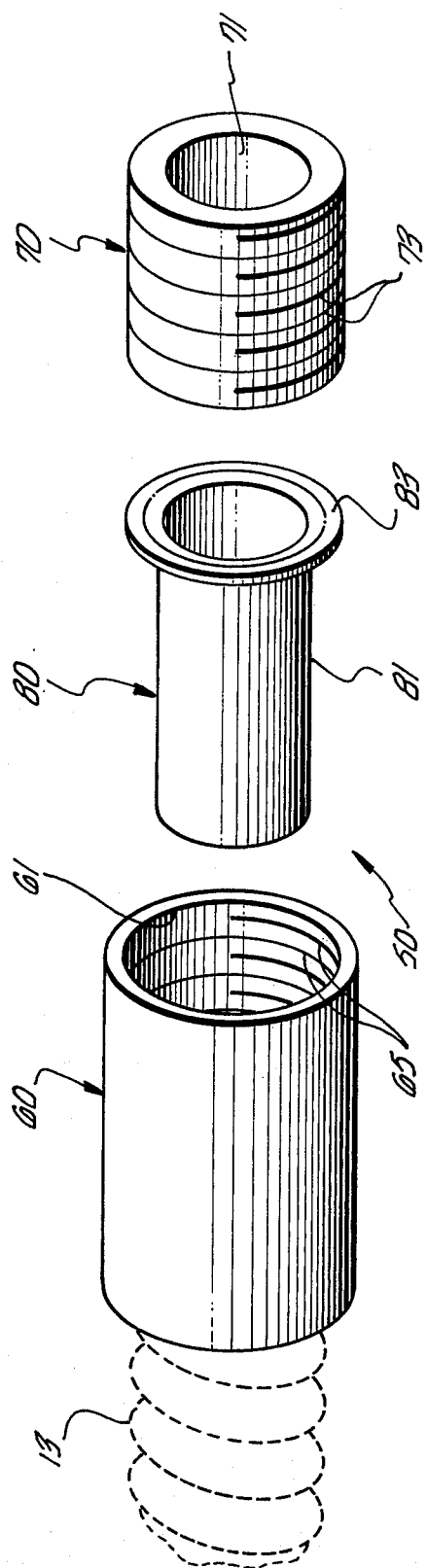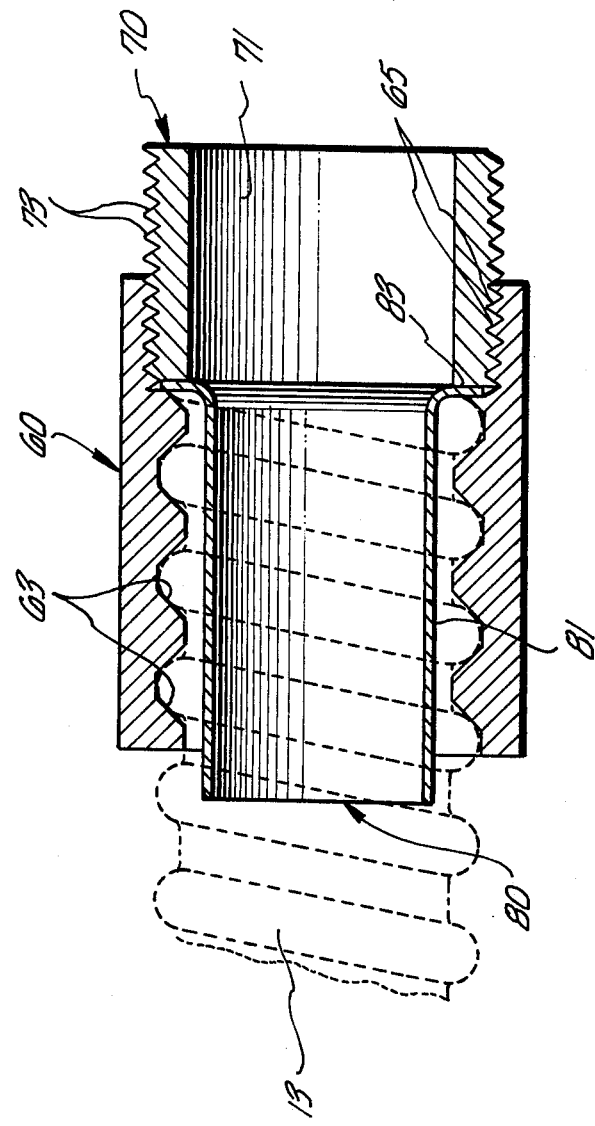

FITTING ASSEMBLY FOR FLEXIBLE TUBING

This is a continuation of application Ser. No. 284,213, filed Aug. 28, 1972, now abandoned.

BACKGROUND OF THE INVENTION

1. Field of the Invention

The present invention relates generally to flexible tubing functioning as conduits for electrical wires and more particularly to fittings adapted for connection to the ends of the flexible tubing.

2. Description of the Prior Art

Flexible tubing suitable for housing electrical wiring usually comprises a spirally wound wire encapsulated within a strip of resilient plastic or rubber. The plastic strip is also spirally wound in an overlapping manner, with the overlaps being bonded to form a continuously sealed cylindrical conduit. Because of the spiral construction, the tubing is capable of bending and twisting when in use. The resilient plastic or rubber material also enables the tubing to contract and expand longitudinally. These many degrees of freedom of movement are a distinct advantage during installation and also during operation, especially when such tubing is utilized to interconnect relatively movable parts.

The main problem involved in using flexible tubing lies in connecting this type of tubing with junction boxes. Heretofore, the tubing was usually threaded into bores formed in the boxes, the threads being formed by the outer surface of the spirally wound wire and plastic coating. The shortcoming with this method of connection is that the tubing end would frequently work itself out of the box bore during operation, thereby exposing the electrical wires contained therein.

Another method of connecting the ends of the tubing to the bores of the junction boxes would be to utilize thread washers onto the ends of the tubings after they were extended through the box bores. This, however, did not solve the problem because the tubing could still work itself out of the washer during operation. The reason for this is that the tubing was able to twist and the threads were able to contract during operation. As a result, the tubing was not able to remain in tight frictional contact with the threaded connections.

SUMMARY OF THE INVENTION

The present invention obviates the above-mentioned shortcomings by providing a fitting assembly that ensures against the tubing working loose from its connection during operation.

In its broadest aspect, the fitting assembly comprises a pair of interconnecting elements and a sleeve. One of the elements is adapted to be threaded on one end of the flexible tubing while the other element is adapted to abut the sleeve as it is being interconnected to the one element. The sleeve is adapted to be inserted within the flexible tubing to engage the interior surface of the flexible tubing. A primary advantage with the present invention is that the sleeve prevents the spiral threads of the flexible tubing from contracting and being pulled from its threaded connection with the first element.

In the preferred embodiment, the interconnection of the two elements causes the sleeve to axially compress the free end of the tubing extending through the first element. This axial compression of the tubing end causes its spiral threads to expand radially against the inner surfaces of the interconnected elements. A primary advantage of this embodiment is that the tight frictional engagement of the tubing within the interconnected members prevents the tubing from becoming unthreaded therewith.

The features of the present invention which are believed to be novel are set forth with particularity in the appended claims. The present invention, both as to its organization and manner of operation, together with the further advantages thereof, may best be understood by reference to the following description, taken in connection with the accompanying drawings.

BRIEF DESCRIPTION OF THE DRAWINGS

FIG. 1 is an exploded perspective view of a fitting assembly of the present invention;

FIG. 2 is a sectional view of the fitting assembly in its assembled form;

FIG. 3 is an exploded view of a second embodiment of the present invention; and

FIG. 4 is a sectional view of the second embodiment in its assembled form.

DESCRIPTION OF THE PREFERRED EMBODIMENTS

Referring now to the drawings, FIGS. 1 and 2 illustrate a fitting assembly, generally indicated by arrow 10, which is especially adapted for connection with one end 11 of a flexible tubing 13. The flexible tubing 13 is conventional in construction and is comprised of a spirally wound wire, (not shown) encapsulated within a spirally wound covering made of a resilient plastic or rubber material.

The fitting assembly 10 comprises a first element 20, a second element 30 and a sleeve 40. The first element 20 is comprised of an annular body portion 21 having a threaded aperture 23 extending therethrough. The first element 20 also includes four resilient tines extending axially from the body portion 21 in the rearward direction. Three thread-like projections 27 are formed on the outer end of each tine 25 and extend radially outward therefrom. The thread-like projections 27 are perpendicular to the axis of the aperture 23 of the first element 20.

The second element 30 comprises a main body portion 31 having an enlarged bore 32 formed within the forward end thereof. A pair of annular ridges 33 are formed on the interior surface of the bore 32 for receiving the projections 27 of the first element tines 25. The second element also includes a second bore 34 extending through the rear portion thereof. The second bore 34 is of a smaller diameter than the first bore 32 and is separated therefrom by a chamfered surface 35. The second element 30 also includes an annular shoulder 36 formed between the two bores 32 and 34. The rearward exterior surface of the second element 30 is formed by a plurality of threads 37.

The sleeve 40 comprises a cylindrical portion 41 and an enlarged end portion 43.

In assembling the fitting assembly 10 onto the end 11 of the tubing 13, the first element 20 is threaded onto the tubing 13 until the tubing end 11 extends through the threaded aperture 23 the amount shown on FIG. 1. After the first element 20 is threaded onto the tubing 13, the cylindrical portion 41 of the sleeve 40 is inserted into the interior of the tubing end 11, until the enlarged end 43 abuts the end 11 of the tubing 13. As shown in FIG. 2, the outside diameter of the cylindrical portion 41 of the sleeve 40 is substantially equal to the inside diameter of the tubing 13. After the sleeve 40 insertion, the forward end of the second element 30 is positioned over the sleeve 40 with the enlarged bore 32 receiving the tines 25 of the first element 20. As the first and second elements 20 and 30 are drawn together, the enlarged end 43 of the sleeve 40 abuts the annular shoulder 36 of the second element 30; whereupon, further movement in bringing the two elements 20 and 30 together causes the enlarged end 43 of the sleeve 40 to axially compress the end 11 of the tubing 13 located between the threaded aperture 33 and the enlarged end 43 of the sleeve 40. This compressive movement continues until the projections 27 of the resilient tines 25 become firmly engaged with the ridges 33 of the second element 30. In this position, shown in FIG. 2, the axial compression of the tubing end 11 causes the compressed threads thereof to radially expand to frictionally engage the inner surfaces of the tines 25 and the enlarged bore 32.

The advantage of this construction is that the tight frictional engagement of the tubing threads with the tines 25 and the bore 32 prevent the tubing 13 from being unthreaded therefrom. Moreover, the cylindrical portion 41 of the sleeve 40 functions to prevent the tubing threads 13 from contracting an amount sufficient to be pulled out of its threaded connection 23 with the first element 20.

After the fitting 10 is assembled, electrical wires (not shown) are now free to be passed through the tubing 13 and through the fitting 10. An advantage of the chamfered surface 35 is that the electrical wire cannot become snagged within the fitting 10. The threaded end 37 of the second element 30 is utilized for connection to any conventional junction box. It should also be noted that the perpendicular construction of the projections 27 and ridges 33 enable the two elements 20 and 30 to be relatively rotatable with respect to each other.

FIGS. 3 and 4 illustrate a second embodiment 50 of the present invention. In this embodiment the fitting assembly 50 comprises a first cylindrical element 60 having a bore 61 extending therethrough. The forward portion of the bore 61 is formed with a plurality of enlarged threads 63 for receiving the enlarged threads of the tubing 13. The rearward portion of the bore 61 is formed with a plurality of smaller threads 65.

The fitting assembly 50 further includes a second cylindrical element 70 having a bore 71 extending therethrough. The outer surface of the second element 70 is formed with a plurality of threads 73 which is adapted to be coupled with the threads 65 of the first element 60.

Finally, the fitting 50 also includes a sleeve 80 which is similar in construction to the sleeve 40 of the first embodiment. The sleeve 80 comprises a cylindrical portion 81 and an enlarged end 83.

In assembly, the first element 60 is threaded onto the tubing 13 until the tubing 13 extends into the bore 61 the amount shown in FIG. 4. Then the sleeve 80 is inserted into the interior of the tubing 13 until the enlarged end 83 abuts the end of the tubing 13. After which, the second element 70 is threaded into the first element 60 until it abuts the enlarged end 83 of the sleeve 80. The final assembly is shown in FIG. 4. In this construction, the tubing 13 is securely connected within the fitting 50 and the sleeve 80 prevents the threads of the tubing 13 from being contracted and pulled out of its connection with the first element 60.

Another advantage of both embodiments is that the enlarged ends of the sleeves prevent the electrical wires extending therethrough from contacting the ends of the flexible tubing. This is particularly important because the ends of the tubing usually had jagged wires exposed which tended to damage the insulation of the electrical wire.

It should be noted that various modifications can be made to the assembly while still remaining within the purview of the following claims. For example, the second element and the sleeve can be integrally formed as a single unit and still cooperate with the first element in the manner described above.

What is claimed is:

1. A fitting assembly for connection to the end of a flexible tubing formed by coils of spirally wound resilient thread, said assembly comprising:

a first coupling part having a threaded bore for threadedly engaging the coils of the flexible tubing with a portion of the coils at the end of the tube having been passed through the first coupling part;

a second coupling part having means for engaging the end of the tube and detachably interengaging the first coupling part to compress the portion of the coils at the end of the tube together and radially expand the tube in the compressed region as the first and second coupling parts are brought together for engagement; and a third coupling part disposed intermediate the first and second coupling parts and attached to the first coupling part, said third coupling part having an interior surface portion adapted to be spaced from peripheral surface regions of the tube before compression of the coils and frictionally engageable with said surface regions after compression when the first and second coupling parts are interengaged, thereby tightly retaining the fitting assembly onto the tube with the compression of the coils further preventing the coils from threadedly passing back through the threaded bore of said first coupling part.

2. The combination of claim 1 wherein said third coupling part is an integral portion of the first coupling part and is threaded to engage with complementary threads on said second coupling part.

3. The combination of claim 1 wherein said first coupling part is engageable with the coils of the tube at a location spaced from the end of the tube.

4. In the combination of claim 1, said first coupling part having an annular configuration with an undulating interior to receive and mate with the coils of the tube, and said third coupling part including a member extending axially alongside the tube with cylindrical bearing surface portions confronting the coils of the tube.

5. The combination of claim 1 additionally including a cylindrical sleeve disposable inside the end section of the tubing, said sleeve having an outside diameter smaller than the inside diameter of the tubing and an enlarged end portion adapted to extend beyond the end of the tubing and contacting said second coupling part.

* * * * *